United States Patent
Wang et al.

(10) Patent No.: US 10,887,477 B2
(45) Date of Patent: Jan. 5, 2021

(54) INFORMATION EXHIBITING DEVICE AND METHOD AND STORAGE MEDIUM

(71) Applicants: BOE Technology Group Co., Ltd., Beijing (CN); Fuzhou BOE Optoelectronics Technology Co., Ltd., Fuzhou (CN)

(72) Inventors: Qiaoni Wang, Beijing (CN); Yabin Lin, Beijing (CN); Hui Chen, Beijing (CN); Chunmei Yang, Beijing (CN); Zhijian Chen, Beijing (CN); Xingming Chen, Beijing (CN); Xinyu Zhang, Beijing (CN)

(73) Assignees: BOE Technology Group Co., Ltd., Beijing (CN); Fuzhou BOE Optoelectronics Technology Co., Ltd., Fuzhou (CN)

( * ) Notice: Subject to any disclaimer, the term of this patent is extended or adjusted under 35 U.S.C. 154(b) by 0 days.

(21) Appl. No.: 16/117,347

(22) Filed: Aug. 30, 2018

(65) Prior Publication Data
US 2019/0238691 A1    Aug. 1, 2019

(30) Foreign Application Priority Data
Jan. 31, 2018    (CN) .......................... 2018 1 0098673

(51) Int. Cl.
*H04N 1/04*    (2006.01)
*H04N 1/00*    (2006.01)
(Continued)

(52) U.S. Cl.
CPC ..... *H04N 1/00328* (2013.01); *G06Q 10/1093* (2013.01); *G06Q 50/01* (2013.01);
(Continued)

(58) Field of Classification Search
CPC .. H04N 1/00328; H04N 1/00244; H04N 1/48; H04N 1/00411; G06Q 10/1093; G06Q 50/01; H94N 1/00411; G06K 9/325
(Continued)

(56) References Cited

U.S. PATENT DOCUMENTS 5,855,006 A * 12/1998 Huemoeller ........... G06Q 10/02
                                                                705/5
6,964,022 B2 * 11/2005 Snowdon .................. G06F 1/16
                                                                715/759
(Continued)

FOREIGN PATENT DOCUMENTS

CN    201413606 Y    2/2010
CN    201655140 U    11/2010
(Continued)

OTHER PUBLICATIONS

First office action of Chinese application No. 201810098673.3 dated Oct. 24, 2019.

*Primary Examiner* — Cheukfan Lee
(74) *Attorney, Agent, or Firm* — Fay Sharpe LLP

(57) ABSTRACT

The present disclosure discloses an information exhibiting device and method. The information exhibiting device includes a display component and an information acquisition component that are connected to each other. The information acquisition component is configured to acquire target information. The display component is provided with an information exhibiting interface which may be displayed on the display component after the information exhibiting device is powered on. The information exhibitive interface includes a target information exhibiting region. The display component is configured to exhibit the target information, which is acquired by the information acquisition component, in the target information display region. The information exhibiting device provided by an embodiment of the present (Continued)

disclosure may guarantee that memo information has low probability of getting lost. Thus, a user may be effectively reminded.

20 Claims, 11 Drawing Sheets

(51) Int. Cl.
  *G06Q 10/10* (2012.01)
  *G06Q 50/00* (2012.01)
  *G06K 9/32* (2006.01)
(52) U.S. Cl.
  CPC ..... *H04N 1/00244* (2013.01); *H04N 1/00411* (2013.01); *G06K 9/325* (2013.01)
(58) Field of Classification Search
  USPC .......................... 358/474, 496, 498; 345/207
  See application file for complete search history.

(56) References Cited

U.S. PATENT DOCUMENTS

| | | | | |
|---|---|---|---|---|
| 2003/0014296 | A1* | 1/2003 | Meine | G06Q 10/109 |
| | | | | 705/319 |
| 2010/0149147 | A1* | 6/2010 | Zhang | H04N 1/48 |
| | | | | 345/207 |
| 2012/0210201 | A1* | 8/2012 | Kim | H04M 1/72519 |
| | | | | 715/202 |
| 2014/0337790 | A1* | 11/2014 | Kim | G06F 3/04842 |
| | | | | 715/781 |
| 2018/0131801 | A1* | 5/2018 | Gardenfors | G06F 1/1694 |

FOREIGN PATENT DOCUMENTS

| | | |
|---|---|---|
| CN | 103455694 A | 12/2013 |
| CN | 104240068 A | 12/2014 |
| CN | 106448434 A | 2/2017 |
| CN | 107181862 A | 9/2017 |
| CN | 107395875 A | 11/2017 |
| CN | 107516470 A | 12/2017 |

\* cited by examiner

INFORMATION EXHIBITING DEVICE AND METHOD AND STORAGE MEDIUM

This application claims priority to the Chinese Patent Application No. 201810098673.3, filed with the State Intellectual Property Office on Jan. 31, 2018 and entitled "INFORMATION EXHIBITING DEVICE AND METHOD", the disclosure of which is incorporated herein by reference in its entirety.

TECHNICAL FIELD

The present disclosure relates to an information exhibiting device and method, and a storage medium.

BACKGROUND

In daily work and life, users often have multiple issues waiting to be processed. In order to avoid forgetting, users can record memo information on paper such as notebooks or sticky notes, etc. to remind themselves to handle the multiple issues in time. However, such a way of recording the memo information easily leads to the loss of the memo information. Thus, the user cannot be effectively prompted.

SUMMARY

Embodiments of the present disclosure provide an information exhibiting device and method, and a storage medium.

In a first aspect, there is provided an information exhibiting device, comprising a display component and an information acquisition component that are connected to each other, wherein the information acquisition component is configured to acquire target information; and the display component is provided with an information exhibiting interface which is abbe to be displayed on the display component after the information exhibiting device is powered on, wherein the information exhibiting interface comprises a target information exhibiting region, and the display component is configured to exhibit the target information, acquired by the information acquisition component, in the target information exhibiting region.

Optionally, the information acquisition component comprises a scanning sub-component and a processing sub-component that are connected to each other;

the scanning sub-component is configured to scan a text-carrying object to acquire a scanned image; and the processing sub-component is configured to perform text recognition on the scanned image to acquire the target information.

Optionally, the display component is a touch display screen, the information exhibiting interface further comprises an information input region, and the information acquisition component comprises a processing sub-component;

the touch display screen is configured to acquire a touch track that is input in the information input region; and the processing sub-component is configured to analyze the touch track to acquire the target information.

Optionally, the information exhibiting device further comprises a base provided with a groove into which the text-carrying object is able to be inserted, and the scanning sub-component is disposed in the groove.

Optionally, the information exhibiting device further comprises a housing that is fixedly connected to the base, the housing and the base constitute an L-shaped structure, and the processing sub-component and the display component are disposed in the housing.

Optionally, the information acquisition component comprises a communication sub-component; and the communication sub-component is configured to receive the target information sent by a terminal which is communicatively connected with the information exhibiting device.

Optionally, the information exhibiting interface further comprises at least one of a calendar exhibiting region for exhibiting calendar information, a time exhibiting region for exhibiting current time and a weather exhibiting region for exhibiting weather information.

Optionally, the information exhibiting interface further comprises a social status information exhibiting region;

the information acquisition component is further configured to acquire date information of the current day;

the information acquisition component is further configured to acquire social status information that corresponds to the date information of the current day from a social status information set of a user, where the social status information set comprises a corresponding relationship between at least one set of the date information and the social status information; and the display component is further configured to exhibit the social status information corresponding to the date information of the current day in the social status information exhibiting region.

Optionally, the information acquisition component is configured to acquire the social status information released by the user and release date information of the social status information from local social application data; and the information acquisition component is configured to store correspondingly the social status information released by the user and the release date information in the social status information set.

Optionally, the information acquisition component comprises a communication sub-component;

the communication sub-component is configured to send an information acquisition request that carries the date information of the current day to a server; and the communication sub-component is further configured to receive the social status information, which is returned by the server and acquired from the social status information set and corresponds to the date information of the current day.

Optionally, the information acquisition component comprises a communication sub-component and a processing sub-component which are interconnected;

the communication sub-component is configured to receive the social status information released by the user and sent by a terminal that is communicatively connected with the information exhibiting device, and the release date information of the social status information, wherein the social status information and the release date information are captured by the terminal from a social application installed in the terminal by using a data capture algorithm; and the processing sub-component is configured to correspondingly store the social status information released by the user and the release date information in the social status information set.

Optionally, the information acquisition component is further configured to extract feature social status information from at least one social status information recorded in the social status information set of the user in accordance with a specified extraction rule; and the display component is further configured to exhibit the feature social status information in the information exhibiting interface.

Optionally, the specified extraction rule comprises at least one of the following: extracting the social status information including a special day field, extracting the social status information including a mood field and extracting the social status information which corresponds to a not commonly used geographic position.

Optionally, the display component is configured to exhibit the feature social status information in the information exhibiting interface in the form of a video or a picture.

In a second aspect, there is provided a information exhibiting method for an information exhibiting device, wherein the information exhibiting device comprises a display component and an information acquisition component that are connected to each other, and the information exhibiting method comprises:

acquiring target information;

exhibiting the target information in a target information exhibiting region in an information exhibiting interface of the information exhibiting device, where the information exhibiting interface is able to be displayed after the information exhibiting device is powered on;

said step of acquiring the target information comprises at least one of the following modes:

scanning a text-carrying object to acquire a scanned image and performing text recognition on the scanned image to acquire the target information; and receiving the target information sent by a terminal which is communicatively connected with the information exhibiting device.

Optionally, the information exhibiting interface further comprises at least one of a calendar exhibiting region for exhibiting calendar information, a time exhibiting region for exhibiting current time and a weather exhibiting region for exhibiting weather information.

Optionally, the information exhibiting interface further comprises a social status information exhibiting region, and the information exhibiting method further comprises:

acquiring date information of the current day;

acquiring the social status information that corresponds to the date information of the current day from a social status information set of a user; and exhibiting the social status information, which corresponds to the date information of the current day, in the social status information exhibiting region, the social status information set comprising a corresponding relationship between at least one set of the date information and the social status information.

Optionally, said step of acquiring the social status information that corresponds to the date information of the current day from the social status information set of the user comprises:

sending an information acquisition request that carries the date information of the current day to a server; and receiving the social status information that is returned by the server and acquired from the social status information set and corresponds to the date information of the current day.

Optionally, the method further comprises:

extracting feature social status information from at least one social status information recorded in the social status information set of the user in accordance with a specified extraction rule; and exhibiting the feature social status information in the information exhibiting interface.

In a third aspect, there is provided a computer readable storage medium on which instructions are stored, and a processing component of a computer executes the information exhibiting method according to claim 15 when the instructions are operated on the processing component.

DETAILED DESCRIPTION

The embodiments of the present disclosure will be described in further detail with reference to the accompanying drawings, to clearly present the principles and advantages of the present disclosure.

Figure 1:
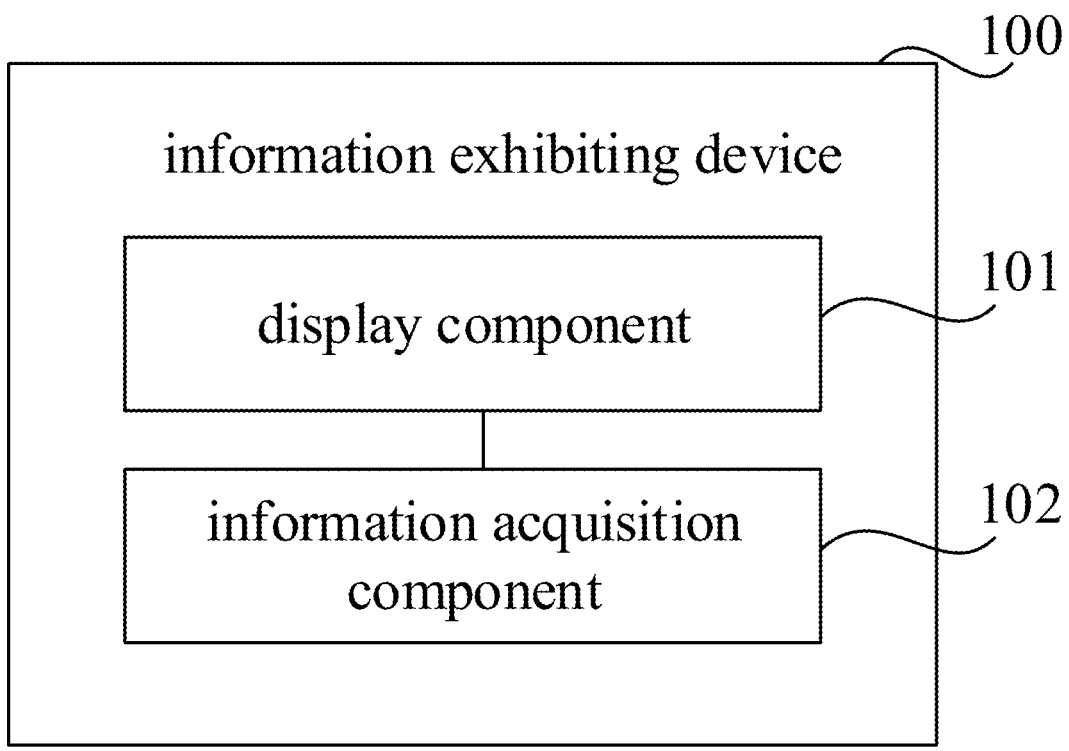
FIG. 1 is a schematic view of an information exhibiting device according to an embodiment of the present disclosure.

FIG. 1 is a schematic view of an information exhibiting device 100 according to an embodiment of the present disclosure. As shown in FIG. 1, the information exhibiting device 100 includes a display component 101 and an information acquisition component 102 that are connected to each other.

The information acquisition component 102 is configured to acquire target information, and the display component 101 is provided with an information exhibiting interface which includes a target information exhibiting region, and the display component 101 is configured to exhibit the target information, acquired by the information acquisition component 102, in the target information exhibiting region.

Optionally, the target information acquired by the information acquisition component 102 may be memo information.

The display component 101 is provided with the information exhibiting interface. Here, so called "provided with the information exhibiting interface" means that the display component 101 may continuously display the information exhibiting interface after the information exhibiting device 100 is powered on. That is, the information exhibiting interface is a fixed interface. The information exhibiting interface includes a target information exhibiting region which is a region for exhibiting the target information in the information exhibiting interface. In summary, the target information may be the memo information. The display component 101 may receive the target information transferred by the information acquisition component 102 and exhibit the information in the target information exhibiting region of the information exhibiting interface after receiving the target information transferred by the information acquisition component 102.

Figure 2:
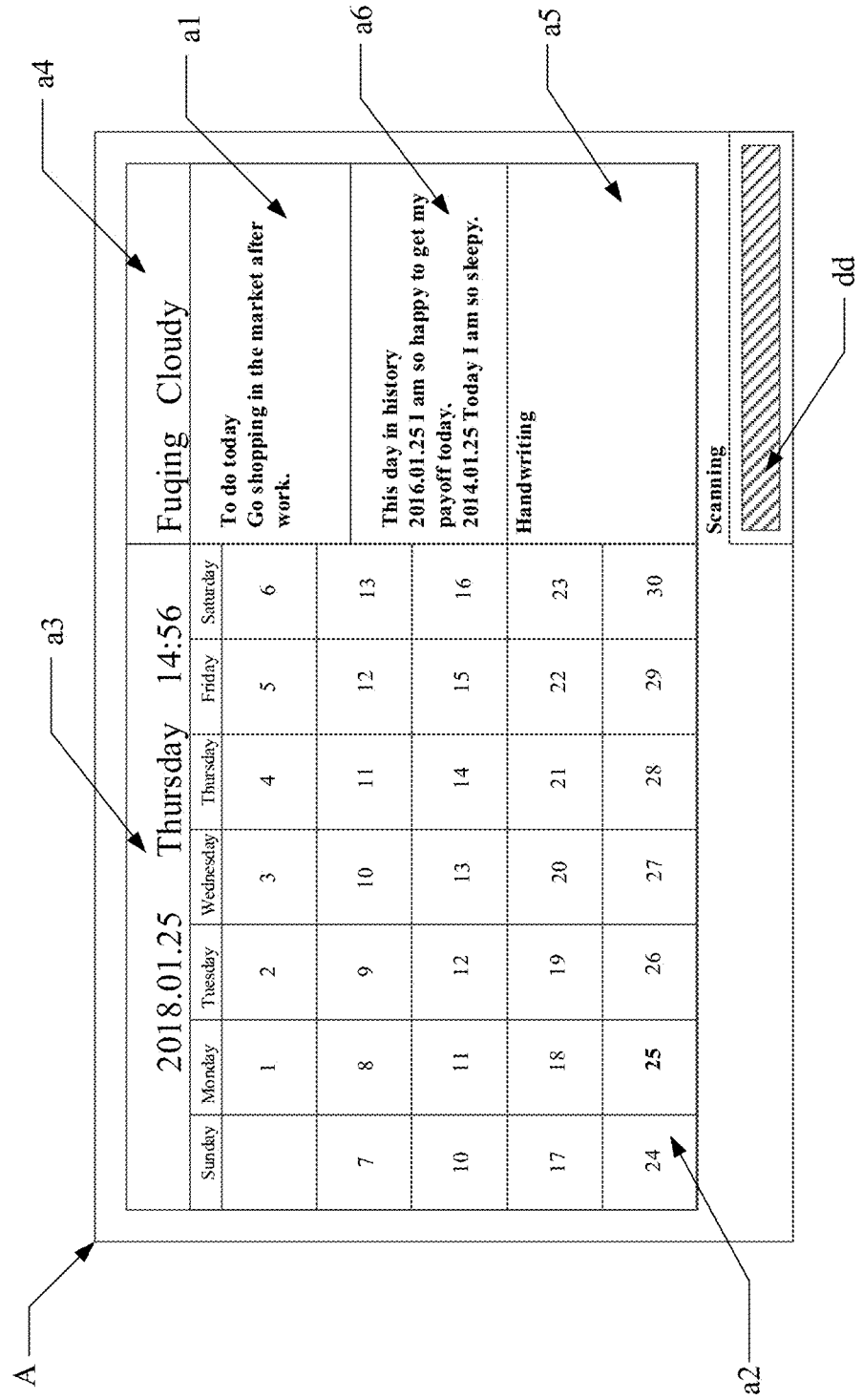
FIG. 2 is a schematic view of another information exhibiting device according to an embodiment of the present disclosure.

FIG. 2 is a schematic view of an exemplary information exhibiting interface A provided by an embodiment of the present disclosure. As shown in FIG. 2, the information exhibiting interface A includes a target information exhibiting area a1. The display component 101 may exhibit the target information in the target information exhibiting region a1 after receiving the target information transferred by the information acquisition component 102. As shown in FIG. 2, the information exhibited in the target information exhibiting region a1 by the display component 101 may be "go shopping in the supermarket after work".

In an embodiment of the present disclosure, besides the target information exhibiting region, the information exhibiting interface may further include other exhibiting regions. For example, the other exhibiting regions may be at least one of a calendar exhibiting region, a time exhibiting region and a weather exhibiting region. The calendar exhibiting region may be used to exhibit the calendar information, the time exhibiting region may be used to exhibit the current time, and the weather exhibiting region may be used to exhibit the weather information of a current geographic position.

An exhibiting region a2 shown in FIG. 2 is the calendar exhibiting region, an exhibiting region a3 is the time exhibiting region, and an exhibiting region a4 is the weather exhibiting region. As shown in FIG. 2, a monthly calendar of a current month may be exhibited in the calendar exhibiting region (that is, the exhibiting region a2), the date information of the current day and current time information may be exhibited in the time exhibiting region (that is, the exhibiting region a3), and a current geographic position and the weather information of the current geographic position may be exhibited in the weather exhibiting region (that is, the exhibiting region a4).

In summary, according to the information exhibiting device provided by the embodiment of the present disclosure, information that may be the memo information is exhibited on the information exhibiting interface of the information exhibiting device, such that the memo information has low probability of getting lost. Thus, a user may be effectively reminded.

Figure 3:
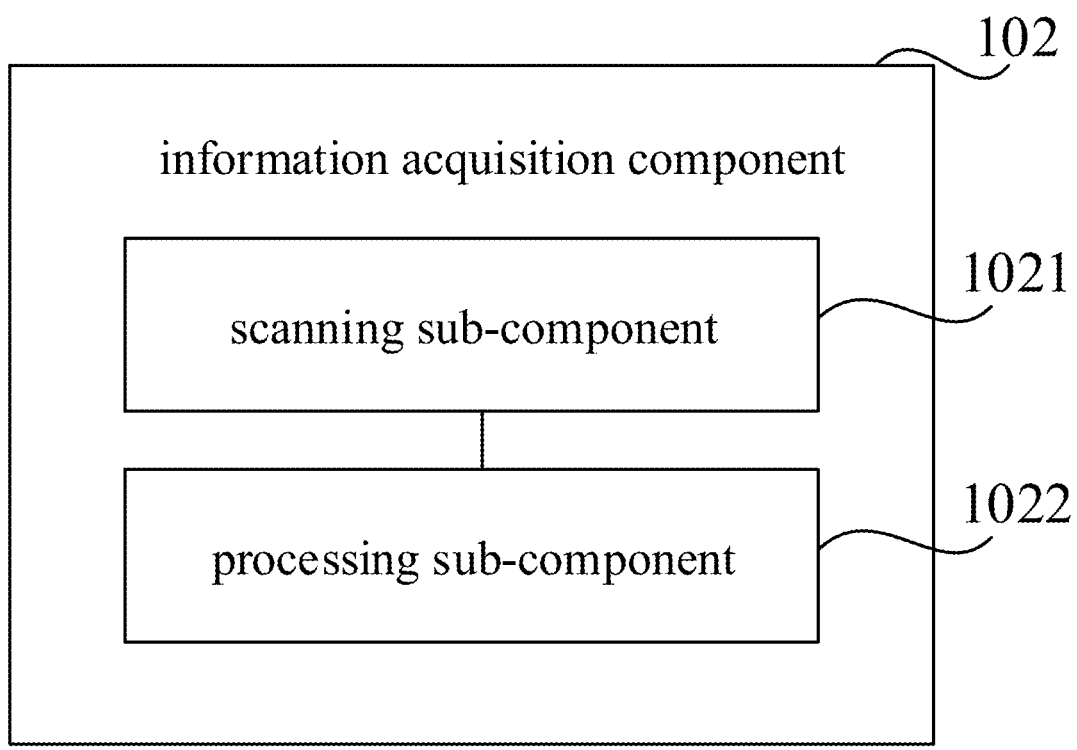
FIG. 3 is a schematic view of an information acquisition component according to an embodiment of the present disclosure.

Optionally, as shown in FIG. 3, the information acquisition component 102 may include a scanning sub-component 1021 and a processing sub-component 1022 that are connected to each other. The scanning sub-component 1021 is configured to scan a text-carrying object to acquire a scanned image. The processing sub-component 1022 is configured to process the scanned image acquired by the scanning sub-component 1021 to acquire the target information.

In the embodiment of the present disclosure, the user may record the target information (the target information may be the memo information) in the form of text on an object, e. g., a sticky note or a notebook, etc. After that, the user may use the scanning sub-component 1021 disposed in the information exhibiting device 100 to scan the object so as to acquire the scanned image. The scanned image may include the target information recorded by the user. The scanning sub-component 1021 may be electronic components with an image shooting function, such as a scanner or a camera, etc.

The scanning sub-component 1021 may transfer the acquired scanned image to the processing sub-component 1022. The processing sub-component 1022 may process the scanned image to perform text recognition on the target information included in the scanned image, thus acquiring recognized text information which is exactly the target information recorded by the user. After that, the processing sub-component 1022 may transfer the target information to the display component 101. The processing sub-component 1022 may be a micro-processor or the like.

Continuously referring to FIG. 2, as shown in FIG. 2, the information exhibiting interface A may further include a scanning option dd. The user may trigger the scanning option dd when the text-carrying object needs to be scanned. The scanning sub-component 1021 in the information exhibiting device 100 may start to scan after the scanning option dd is triggered.

Figure 4:
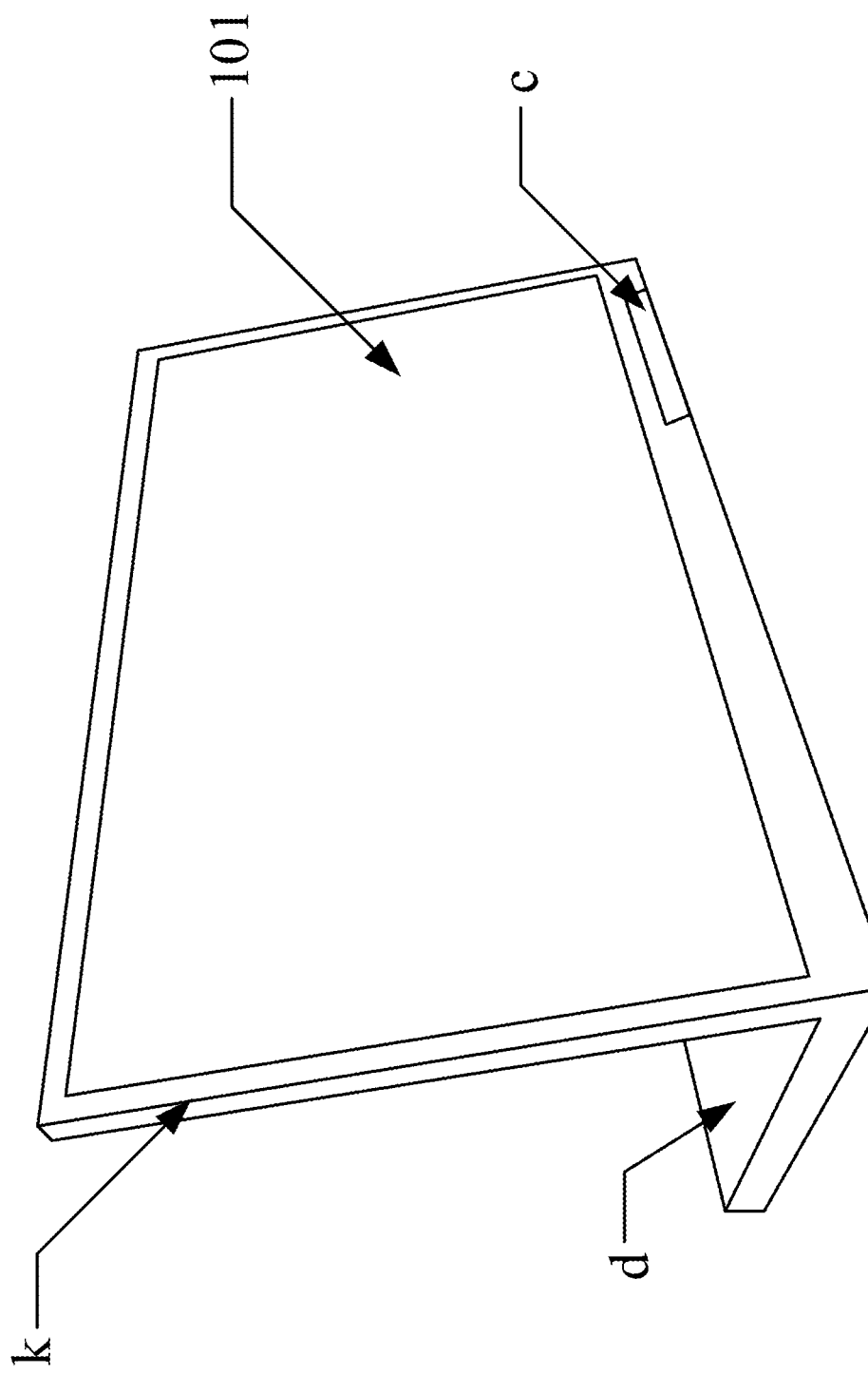
FIG. 4 is a schematic view of another information exhibiting device according to an embodiment of the present disclosure.

Optionally, as shown in FIG. 4, the information exhibiting device 100 may include a base d and a housing k that are fixedly connected. The base d and the housing k may constitute an L-shaped structure. A groove c into which the text-carrying object may be inserted is provided on the base d. The scanning sub-component 1021 may be disposed in the groove c. The processing sub-component 1022 and the display component 101 may be disposed in the housing k. Optionally, the display component 101 may be a display screen that may be disposed in the housing k in an embedded mode. A light-exiting surface of the display screen faces an outer side of the housing k.

The L-shaped structure consisting of the base d and the housing k can ensure that the information exhibiting device 100 can be steadily placed on a planar object, e. g., a desktop, etc. Thus, it is convenient for the user to use the information exhibiting device 100.

Besides, as the groove c is formed on the base d, the user may conveniently place the text-carrying object, which needs to be scanned, in the groove c, such that the scanning sub-component 1021 disposed in the groove c may be utilized to complete scanning. Thus, it is also convenient for the user to use the information exhibiting device 100.

Certainly, in the embodiments of the present disclosure, there also may be no groove c in the information exhibiting device 100. In this case, the scanning sub-component 1021 may be disposed on the base d or the housing k. The user may place the text-carrying object, which needs to be scanned, in front of the scanning sub-component 1021 for scanning by the scanning sub-component 1021.

Certainly, the information acquisition component 102 in the information exhibiting device 100 may acquire the target information by means of not only scanning but also others, such that the user may flexibly select convenient modes to record the target information in accordance with actual situations. In the following, the embodiment of the present disclosure will provide two optional modes in which the information acquisition component 102 acquires the target information.

The first mode is that the information acquisition component 102 acquires the target information by means of manual input.

Optionally, the information exhibiting interface may further include an information input region. As shown in FIG. 2, an exhibiting region a5 is the information input region. The display component 101 may be a touch display screen. The touch display may acquire a touch track input in the input region and transfer the acquired touch track to the processing sub-component 1022. The processing sub-component 1022 may analyze the touch track acquired by the display component 101 to acquire the target information. After that, the processing sub-component 1022 may transfer the acquired target information to the display component 101 for the display component 101 to exhibit in the target information exhibiting region.

In other words, during use, the user may input the target information (the target information may be the memo information) in the information input region of the information exhibiting interface by means of manual input. The display component 101 (that is, the touch display screen) may acquire the touch track hand input by the user. The processing sub-component 1022 may analyze the touch track to obtain the target information hand input by the user. After that, the processing sub-component 1022 may transfer the acquired target information to the display component 101 for the display component 101 to exhibit in the target information exhibiting region.

The second mode is that the information acquisition component 102 acquires the target information by a terminal which is communicatively connected with the information exhibiting device 100.

Figure 5:
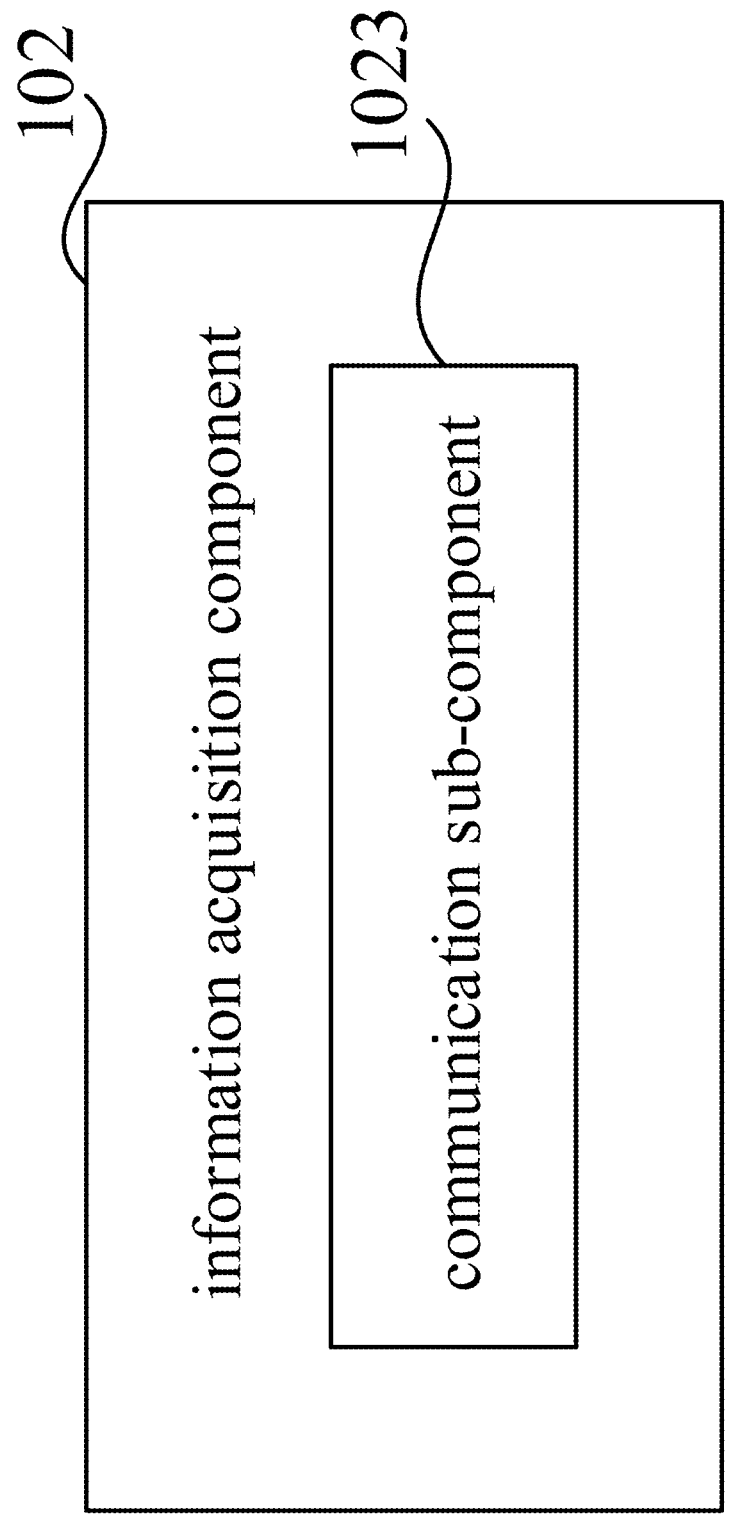
FIG. 5 is a schematic view of another information acquisition component according to an embodiment of the present disclosure.

Optionally, as shown in FIG. 5, the information acquisition component 102 may include a communication sub-component 1023. For example, the communication sub-component 1023 may be an RF (Radio Frequency) communication component, a WiFi (Wireless Fidelity) communication component, a near field communication component or the like. The near field communication component may be a Bluetooth communication component, an infrared communication component, a ZigBee communication component or the like.

The communication sub-component 1023 can communicate with the terminal to receive the target information sent by the terminal, and transfer the target information to the display component 101, such that the display component 101 may exhibit the target information in the target information exhibiting region of the information exhibiting interface.

In the embodiment of the present disclosure, a memo APP may be installed in the terminal of the user. The user may input the memo information (the target information) in a memo information input interface provided by the memo APP. The terminal may send the memo information input by the user to the communication sub-component 1023 of the information exhibiting device 100 after the terminal of the user is communicatively connected with the information exhibiting device 100. In this way, the communication sub-component 1023 may transfer the target information to the display component 101 for the display component 101 to exhibit the target information in the target information exhibiting region of the information exhibiting interface.

Figure 6:
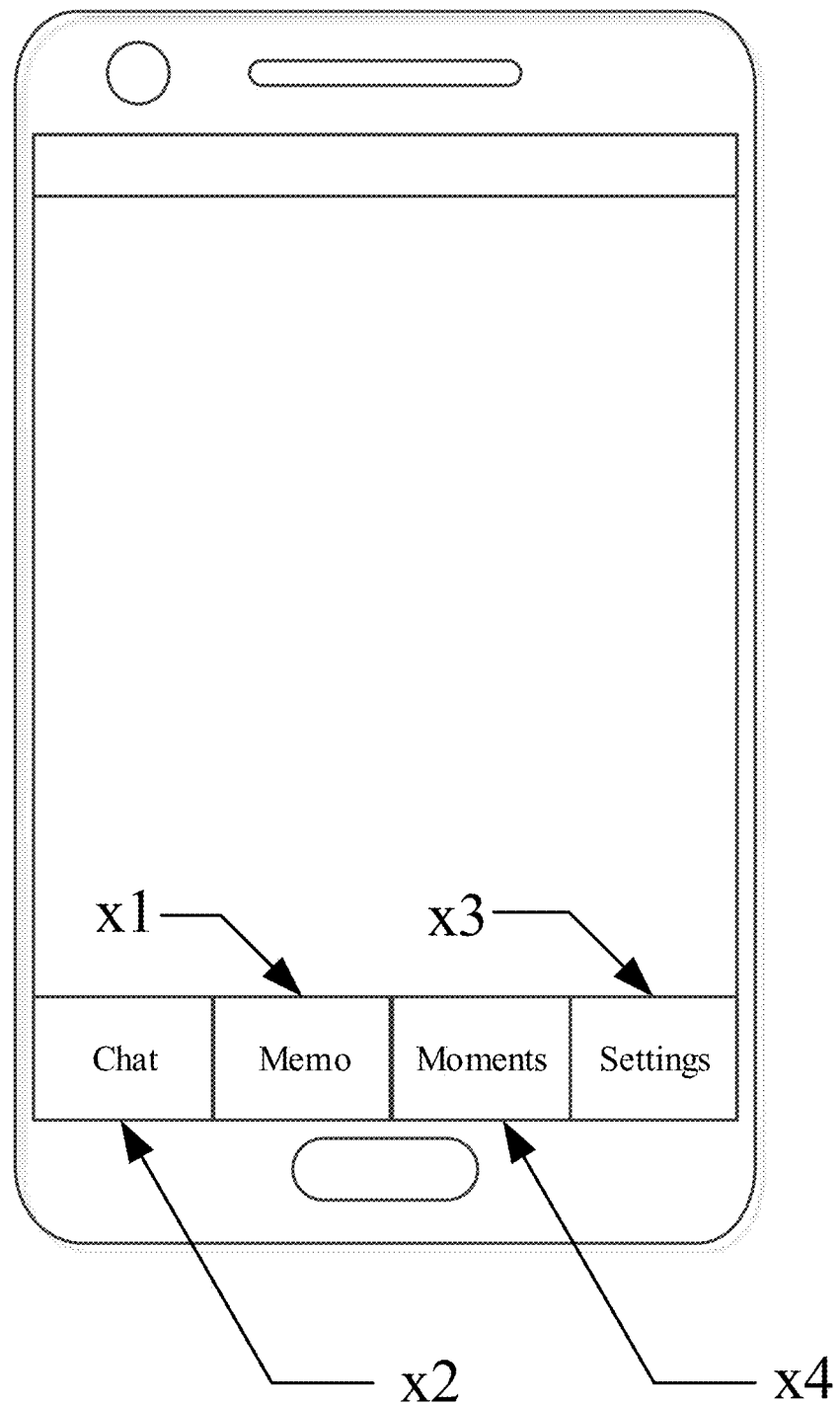
FIG. 6 is a schematic view of an interface of a memo APP according to an embodiment of the present disclosure.
Figure 7:
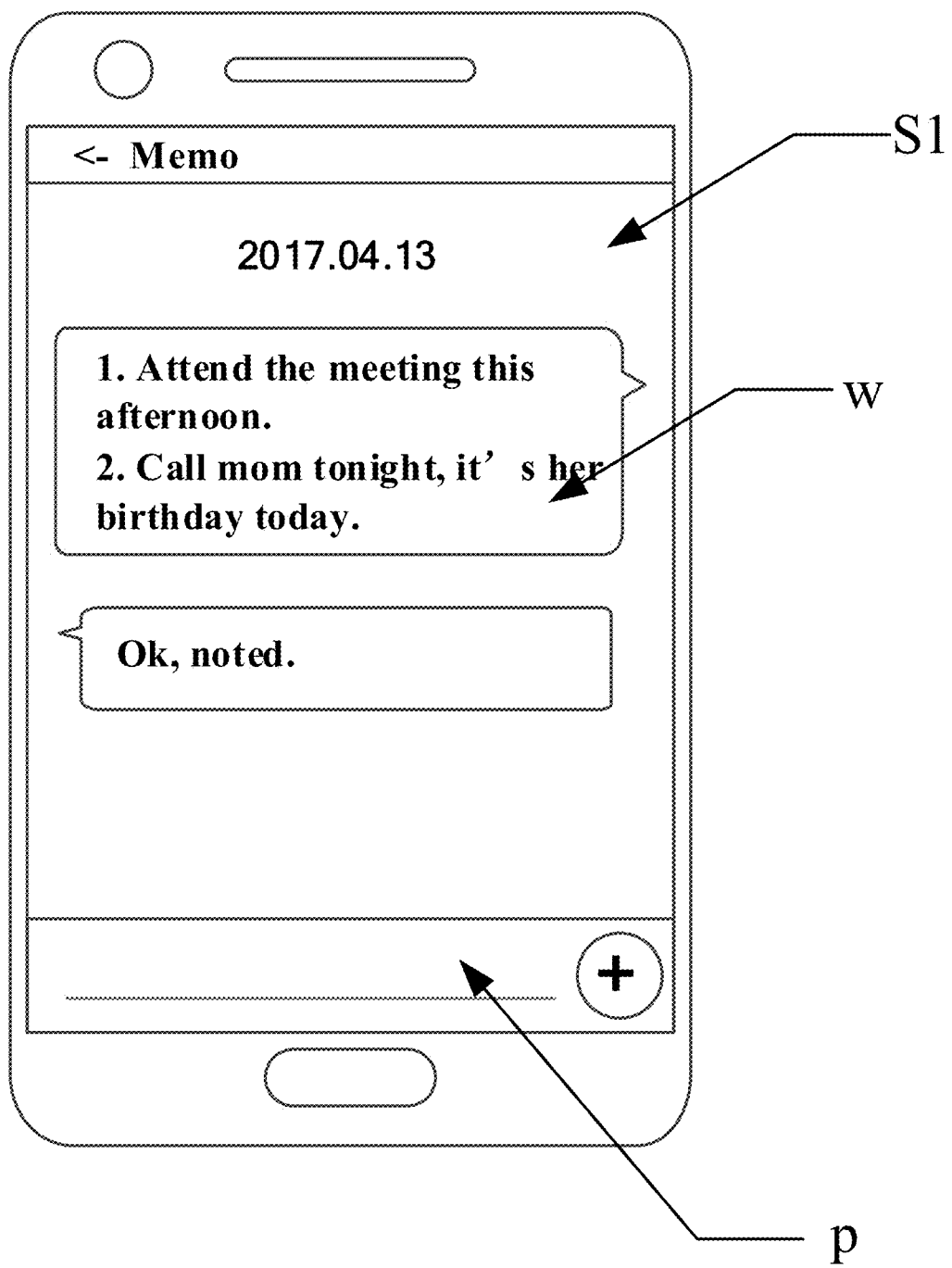
FIG. 7 is a schematic view of a memo information input interface according to an embodiment of the present disclosure.

FIG. 6 is a schematic view of an interface of a memo APP provided by an embodiment of the present disclosure. As shown in FIG. 6, a memo option x1 may be disposed in the interface of the memo APP. The memo APP may provide a memo information input interface S1 shown in FIG. 7 after the memo option x1 is triggered. The memo information input interface S1 may include an input box p which allows the user to input the memo information. Input memo information w may be exhibited in the memo information input interface S1.

Figure 8:
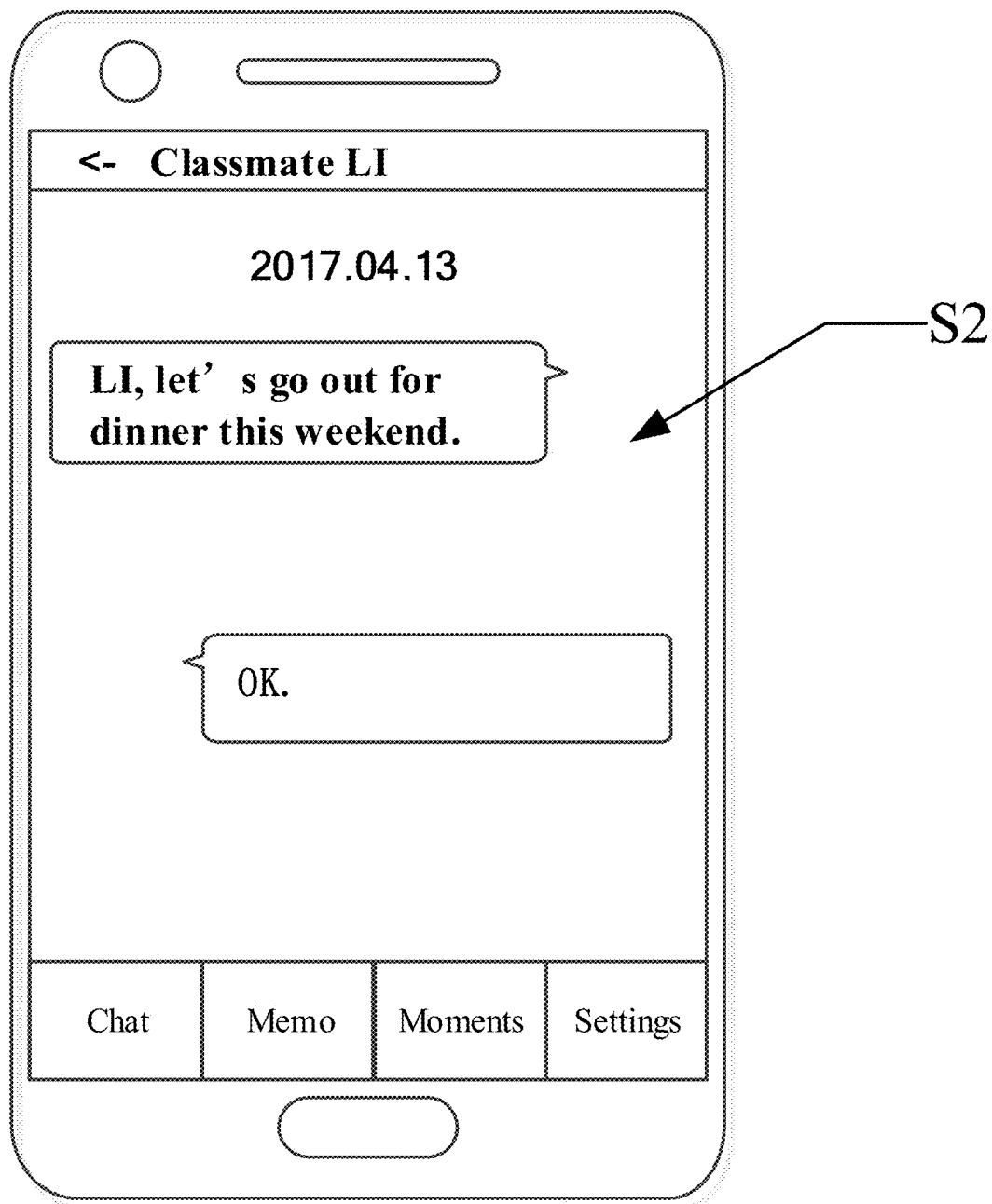
FIG. 8 is a schematic view of a chat interface according to an embodiment of the present disclosure.
Figure 9:
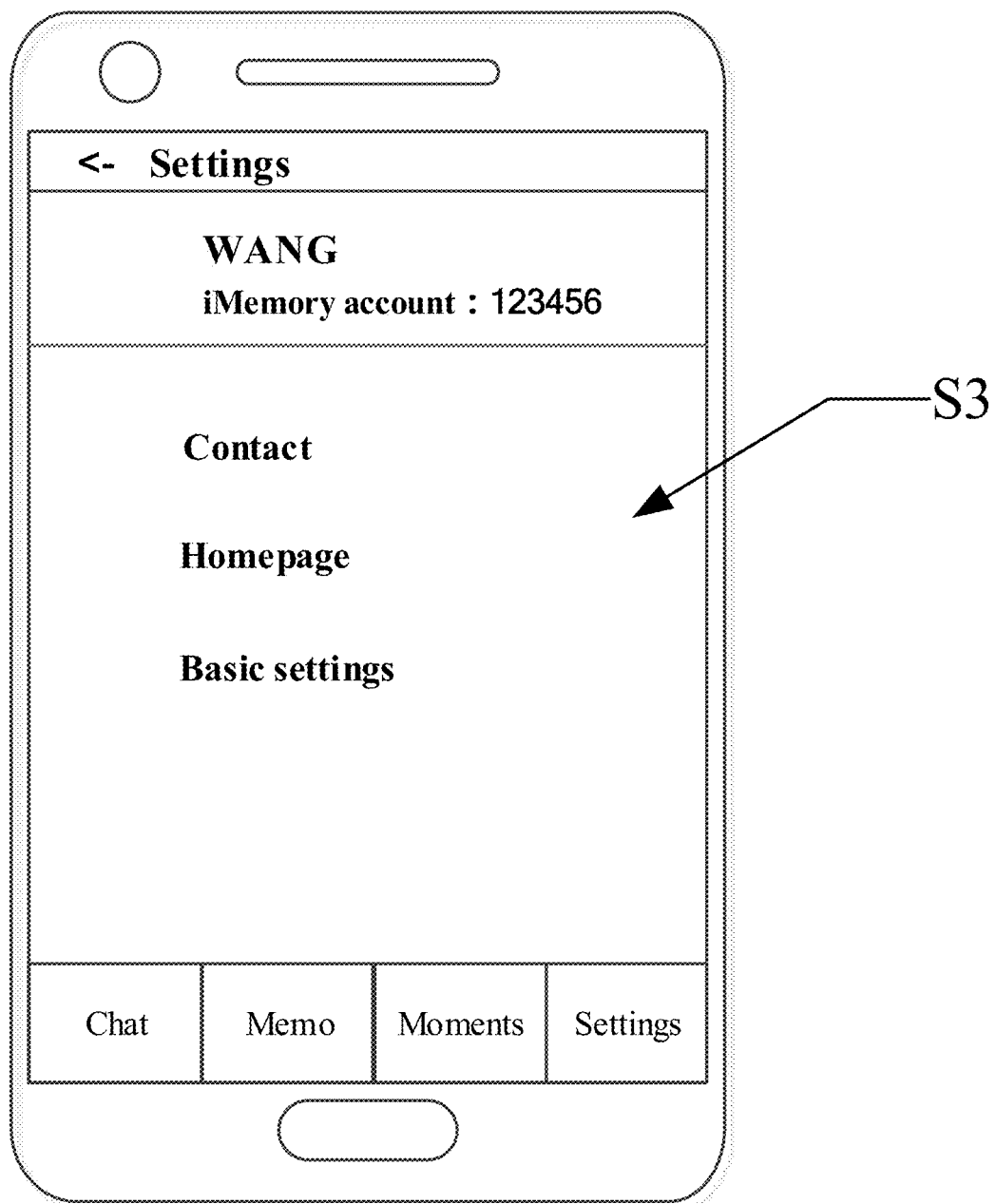
FIG. 9 is a schematic view of a set interface according to an embodiment of the present disclosure.
Figure 10:
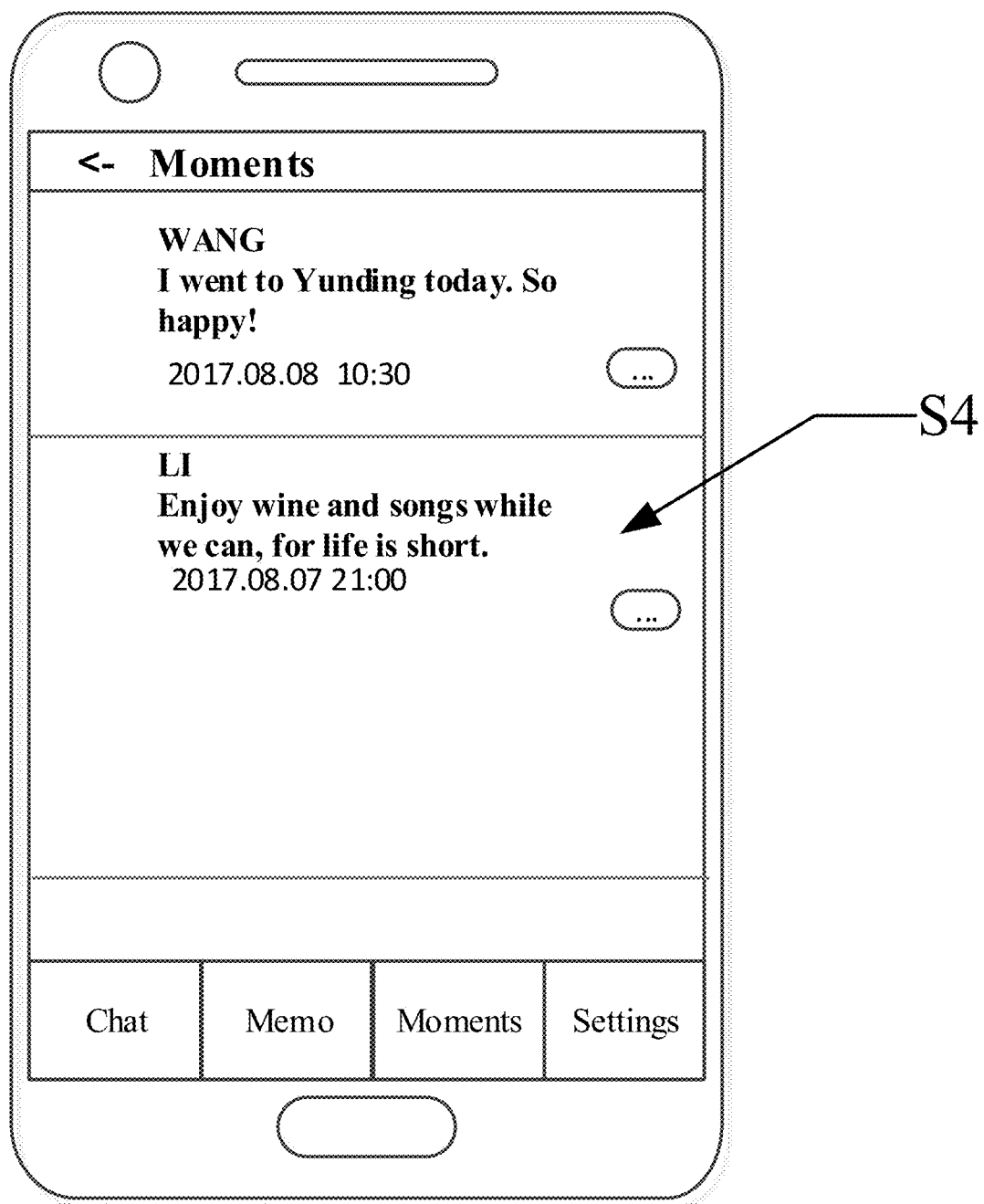
FIG. 10 is a schematic view of a social networking status information release interface according to an embodiment of the present disclosure.

Optionally, as shown in FIG. 6, besides the memo option x1, the interface of the memo APP may further include a chat option x2, a setting option x3 and a social status information release option x4. The memo APP may provide a chat interface S2 shown in FIG. 8 after the chat option x2 is triggered. The user may chat with his/her social friends in the chat interface S2. The memo APP may provide a set interface S3 shown in FIG. 9 after the set option x3 is triggered. The setting interface S3 may include a plurality of setting options. The setting options may be used by the user to correspondingly set the memo APP after being triggered. The memo APP may provide a social status information release interface S4 after the social status information release option x4 is triggered. In the social status information release interface, the user may not only release social status information but also view social status information released by his/her social friends.

The information exhibiting device 100 provided by the embodiment of the present disclosure may exhibit not only the memo information but also the social status information. The social status information means status information released by the user in a social application.

In an embodiment of the present disclosure, the information exhibiting device 100 may exhibit the social status information in accordance with the date information of the current day.

Optionally, the information acquisition component 102 may acquire the date information of the current day, and acquire the social status information that corresponds to the date information of the current day from a social status information set of the user. The social status information set of the user includes a corresponding relationship between at least one set of the date information and the social status information. After that, the information acquisition component 102 may transfer the social status information that corresponds to the date information of the current day to the display component 101 for the display component 101 to exhibit in the information exhibiting interface. In an embodiment of the present disclosure, the information exhibiting interface may further include a social status information exhibiting region. As shown in FIG. 2, an exhibiting region a6 is the social status information exhibiting region. The display component 101 may exhibit the social status information that corresponds to the date information of the current day in the social status information exhibiting region.

For example, when the date information of the current day, acquired by the information acquisition component 102, is January 25, the information acquisition component 102 may inquire the social status information set of the user in accordance with "January 25", and acquire two pieces of social status information that correspond to "January 25" from the social status information set. The two pieces of social status information are "happy to get paid today" and "so sleepy today", which are released by the user on Jan. 25, 2016 and Jan. 25, 2014 respectively. After that, the information acquisition component 102 may transfer these two pieces of social status information to the display component 101 for the display component 101 to exhibit them in the social status information exhibiting region of the information exhibiting interface.

In a possible implementation, the social status information set may be locally maintained in the information exhibiting device 100. In this case, the information acquisition component 102 may inquire the social status information that corresponds to the date information of the current day in the locally maintained social status information set and transfer the social status information to the display component 101.

Optionally, a first social application may be installed in the information exhibiting device 100. The information acquisition component 102 may acquire local data of the first social application periodically or in real time, and acquire social status information released by the user and release date information of the social status information from the local data of the first social application. After that, the information acquisition component 102 may correspondingly store the social status information released by the user and the release date information of the social status information in the social status information set so as to locally maintain the social status information set in the information exhibiting device 100.

Optionally, the communication sub-component 1023 may receive the social status information that is sent by the terminal and released by the user and the release date information of the social status information after the information exhibiting device 100 is communicatively connected with the terminal of the user. The social status information and the release date information of the social status information are captured by the terminal from a second social application installed in the terminal by using a data capture algorithm (e. g., crawler algorithm). The communication sub-component 1023 may transfer the social status information that is sent by the terminal and released by the user and the release date information of the social status information to the processing sub-component 1022. After that, the processing sub-component 1022 may correspondingly store the social status information released by the user and the release date information of the social status information in the social status information set, such that the social status information set is locally maintained in the information exhibiting device 100.

Certainly, the social status information set may not be locally maintained in the information exhibiting device 100. In this case, the communication sub-component 1023 may send an information acquisition request that carries the date information of the current day to a server. After receiving the information acquisition request, the server may acquire the social status information that corresponds to the date information of the current day from the social status information set maintained by the server and send the acquired social status information to the communication sub-component 1023. The communication sub-component 1023 may transfer the social status information to the display component 101 after receiving the social status information sent by the server.

In another embodiment of the present disclosure, the information exhibiting device 100 may exhibit feature social networking status information.

Optionally, the information acquisition component 102 may acquire the feature social status information from at least one social status information recorded by the social status information set of the user in accordance with a specified extraction rule. The specified extraction rule includes: extracting social status information of a special day field, extracting social status information of a mood field and/or extracting social status information which corresponds to a not commonly used geographic position.

For example, the information acquisition component 102 may extract the feature social status information of special day fields including birthday, wedding anniversary or the like from the social status information set of the user. The information acquisition component 102 may further extract the feature social status information of mood fields including "happy", "painful", "sad" or the like from the social status information set of the user. The information acquisition component 102 may further extract the feature social status information released when the user goes out for a trip from the social status information set of the user. Since a geographic position corresponding to the social status information that is released when the user goes out for a trip is not a commonly used geographic position, the information acquisition component 102 may extract the social status information which corresponds to the not commonly used geographic position from the social status information set. The social status information is the feature social status information released when the user goes out for a trip.

The information acquisition component 102 may transfer the extracted feature status information to the display component 101 for the display component 101 to exhibit the feature social status information in the information exhibiting interface in the form of a video or a picture. Usually, the information acquisition component 102 may execute the technical processes of extracting the feature status information and transferring the extracted feature status information to the display component 102 according to a specified cycle. For example, the specified cycle may be one or half a year or the like.

In summary, in the information exhibiting device provided by the embodiment of the present disclosure, the information that may be memo information is exhibited on the information exhibiting interface of the information exhibiting device, such that the memo information is not easy to be lost. Thus, the user can be effectively reminded.

Figure 11:
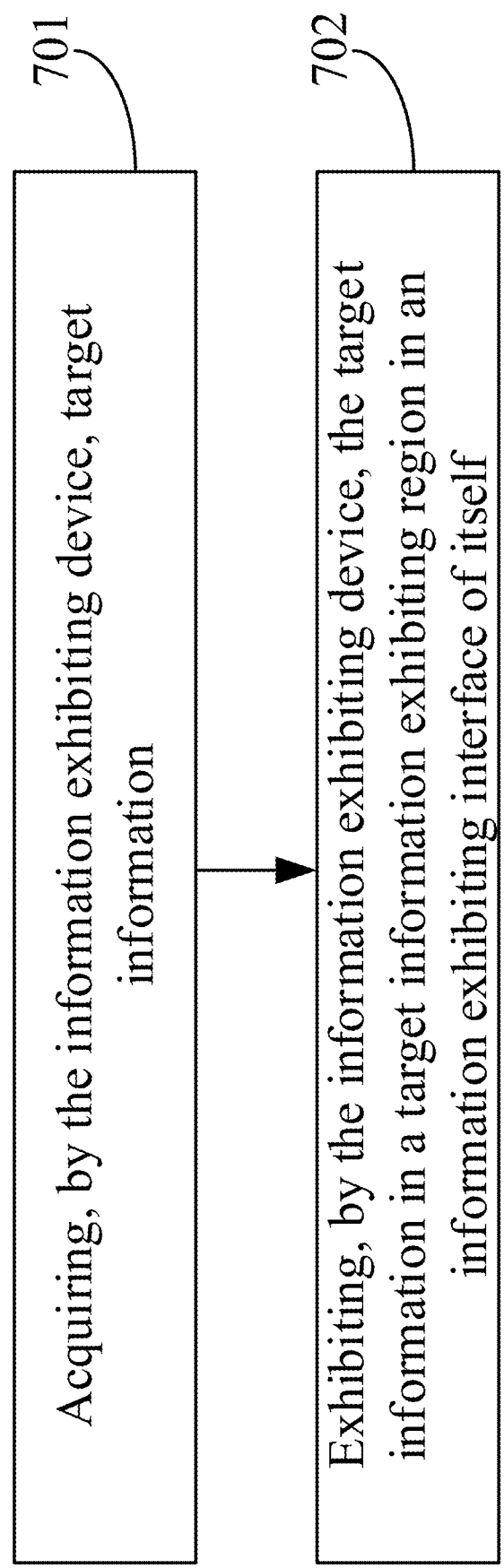
FIG. 11 is a flow chart of an information exhibiting method according to an embodiment of the present disclosure.

An embodiment of the present disclosure may further provide an information exhibiting method which may be used in the information exhibiting device 100 described above. FIG. 11 is a flow chart of the information exhibiting method. As shown in FIG. 11, the information exhibiting method includes the following steps.

In step 701, the information exhibiting device acquires target information.

A technical process that the information exhibiting device acquires the target information may be that the information exhibiting device scans a text-carrying object to acquire a scanned image, and the scanned image is processed to acquire the target information.

Alternatively, the technical process that the information exhibiting device acquires the target information may be that the information exhibiting device receives the target information sent by a terminal.

In step 702, the information exhibiting device exhibits the target information in a target information exhibiting region in an information exhibiting interface of itself.

In summary, in the information exhibiting method provided by the embodiment of the present disclosure, the information that may be memo information is exhibited on the information exhibiting interface of the information exhibiting device, such that the memo information is not easy to be lost and the user can be effectively reminded.

Optionally, the information exhibiting device may acquire a touch track in the information input region of the information exhibiting interface, and analyze the touch track to acquire the target information.

Optionally, the information exhibiting interface further comprises at least one of a calendar exhibiting region for exhibiting calendar information, a time exhibiting region for exhibiting current time and a weather exhibiting region for exhibiting weather information.

Optionally, the information exhibiting device may acquire the date information of the current day, and acquire social status information that corresponds to the date information of the current day from a social status information set of a user. The social status information set comprises a corresponding relationship between at least one set of the date information and the social status information, and the social status information, which corresponds to the date information of the current day, is exhibited in the social status information exhibiting region.

Optionally, the information exhibiting device may acquire the social status information released by the user and the release date information of the social status information from local social application data, and correspondingly store the social status information released by the user and the release date information in the social status information set.

Optionally, the information exhibiting device may send an information acquisition request that carries the date information of the current day to a server, and receive the social status information corresponding to the date information of the current day, which is returned by the server and acquired from the social status information set.

Optionally, the information exhibiting device may receive the social status information, which is released by the user and sent by a terminal and the release date information of the social status information. The social status information and the release date information are captured by the terminal from a social application installed in the terminal by using a data capture algorithm. The information exhibiting device may correspondingly store the social status information released by the user and the release date information in the social status information set.

Optionally, the information exhibiting device may extract feature social status information from at least one social status information recorded in the social status information set of the user in accordance with a specified extraction rule; and exhibit the feature social status information in the information exhibiting interface.

Optionally, the specified extraction rule comprises at least one of the following: extracting the social status information including a special day field, extracting the social status information including a mood field and/or extracting the social status information which corresponds to a not commonly used geographic position.

Optionally, the information exhibiting device may exhibit the feature social status information in the information exhibiting interface in the form of a video or a picture.

An embodiment of the present disclosure further provides a computer readable storage medium. The computer readable storage medium may be non-volatile storage medium and may stores therein computer programs that, when executed by a processing component, cause to perform the information exhibiting method provided in the embodiments of the present disclosure, such as the information exhibiting method shown in FIG. 11.

In an exemplary embodiment, there is further provided a computer program product having instructions stored therein. The computer program product, when operating in a computer, causes the computer to perform the information exhibiting method provided in the embodiments of the present disclosure.

In an exemplary embodiment, there is further provided a chip comprising a programmable logic circuits and/or program instructions. The chip operates to perform the information exhibiting method provided in the embodiments of the present disclosure.

Persons of ordinary skill in the art can understand that all or part of the steps described in the above embodiments can be completed through hardware, or through relevant hardware instructed by applications stored in a non-transitory computer readable storage medium, such as read-only memory, disk or CD, etc. Specifically, some embodiments provide a non-transitory computer readable storage medium on which instructions are stored, and a processing component of a computer executes an information exhibiting method when the instructions are operated on the processing component. The information exhibiting method is applied to an information exhibiting device, wherein the information exhibiting device comprises a display component and an information acquisition component that are connected to each other, and the information exhibiting method comprises: acquiring target information; and exhibiting the target information in a target information exhibiting region in an information exhibiting interface of the information exhibiting device, where the information exhibiting interface is able to be displayed after the information exhibiting device is powered on. Here, said step of acquiring the target information comprises: scanning a text-carrying object to acquire a scanned image and performing text recognition on the scanned image to acquire the target information; or, scanning a text-carrying object to acquire a scanned image and performing text recognition on the scanned image to acquire first target information, and receiving second target information sent by a terminal which is communicatively connected with the information exhibiting device. Further, the information exhibiting interface further comprises a social status information exhibiting region, and the information exhibiting method further comprises: acquiring date information of a current day; acquiring the social status information that corresponds to the date information of the current day from a social status information set of a user; and exhibiting the social status information, which corresponds to the date information of the current day, in the social status information exhibiting region, the social status information set comprising a corresponding relationship between at least one set of the date information and the social status information.

The foregoing descriptions are only exemplary embodiments of the present disclosure, and are not intended to limit the present disclosure. Any modifications, equivalent substitutions, improvements, etc., within the spirit and principles of the disclosure, shall fall into the protection scope of the present disclosure.

What is claimed is:

1. An information exhibiting device, comprising a display component and an information acquisition component that are connected to each other, wherein
the information acquisition component is configured to acquire target information; and
the display component is provided with an information exhibiting interface which is able to be displayed on the display component after the information exhibiting device is powered on, the information exhibiting interface comprises a target information exhibiting region, and the display component is configured to exhibit the target information acquired by the information acquisition component in the target information exhibiting region,
wherein the information acquisition component comprises a scanning sub-component and a processing sub-component that are connected to each other;
the scanning sub-component is configured to scan a text-carrying object to acquire a scanned image; and
the processing sub-component is configured to perform text recognition on the scanned image to acquire the target information, and
wherein the information exhibiting interface further comprises a social status information exhibiting region;

the information acquisition component is further configured to acquire date information of a current day;

the information acquisition component is further configured to acquire social status information that corresponds to the date information of the current day from a social status information set of a user, where the social status information set comprises a corresponding relationship between at least one set of the date information and the social status information; and the display component is further configured to exhibit the social status information corresponding to the date information of the current day in the social status information exhibiting region.

2. The information exhibiting device according to claim 1, wherein the display component is a touch display screen, the information exhibiting interface further comprises an information input region, and the information acquisition component comprises a processing sub-component;

the touch display screen is configured to acquire a touch track that is input in the information input region; and the processing sub-component is configured to analyze the touch track to acquire the target information.

3. The information exhibiting device according to claim 1, wherein the information exhibiting device further comprises a base with a groove into which the text-carrying object is able to be inserted, and the scanning sub-component is within the groove; and a housing that is fixedly connected to the base, the housing and the base constitute an L-shaped structure, and the processing sub-component and the display component are in the housing.

4. The information exhibiting device according to claim 1, wherein the information acquisition component further comprises a communication sub-component; and the communication sub-component is configured to receive the target information sent by a terminal which is communicatively connected with the information exhibiting device.

5. The information exhibiting device according to claim 1, wherein the information acquisition component is configured to acquire the social status information released by the user and release date information of the social status information from local social application data; and the information acquisition component is configured to store correspondingly the social status information released by the user and the release date information in the social status information set.

6. The information exhibiting device according to claim 1, wherein the information acquisition component comprises a communication sub-component;

the communication sub-component is configured to send an information acquisition request that carries the date information of the current day to a server; and the communication sub-component is further configured to receive the social status information, which is returned by the server and acquired from the social status information set and corresponds to the date information of the current day.

7. The information exhibiting device according to claim 1, wherein the information acquisition component comprises a communication sub-component and a processing sub-component which are interconnected;

the communication sub-component is configured to receive the social status information released by the user and sent by a terminal that is communicatively connected with the information exhibiting device, and the release date information of the social status information, where the social status information and the release date information are captured by the terminal from a social application installed in the terminal by using a data capture algorithm; and the processing sub-component is configured to correspondingly store the social status information released by the user and the release date information in the social status information set.

8. The information exhibiting device according to claim 1, wherein the information acquisition component is further configured to extract feature social status information from at least one social status information recorded in a social status information set of a user in accordance with a specified extraction rule; and the display component is further configured to exhibit the feature social status information in the information exhibiting interface.

9. The information exhibiting device according to claim 8, wherein the specified extraction rule comprises at least one of the following: extracting the social status information including a special day field, extracting the social status information including a mood field and extracting the social status information which corresponds to a not commonly used geographic position.

10. The information exhibiting device according to claim 8, wherein the display component is configured to exhibit the feature social status information in the information exhibiting interface in the form of one of a video and a picture.

11. An information exhibiting method for an information exhibiting device, wherein the information exhibiting device comprises a display component and an information acquisition component that are connected to each other, and the information exhibiting method comprises:

acquiring target information; and exhibiting the target information in a target information exhibiting region in an information exhibiting interface of the information exhibiting device, where the information exhibiting interface is able to be displayed after the information exhibiting device is powered on, wherein said step of acquiring the target information comprises:

scanning a text-carrying object to acquire a scanned image and performing text recognition on the scanned image to acquire the target information; or, scanning a text-carrying object to acquire a scanned image and performing text recognition on the scanned image to acquire first target information, and receiving second target information sent by a terminal which is communicatively connected with the information exhibiting device, wherein the information exhibiting interface further comprises a social status information exhibiting region, and the information exhibiting method further comprises:

acquiring date information of a current day;

acquiring the social status information that corresponds to the date information of the current day from a social status information set of a user; and exhibiting the social status information, which corresponds to the date information of the current day, in the social status information exhibiting region, the social status information set comprising a corresponding relationship between at least one set of the date information and the social status information.

12. The information exhibiting method according to claim 11, wherein said step of acquiring the social status information that corresponds to the date information of the current day from the social status information set of the user comprises:
  sending an information acquisition request that carries the date information of the current day to a server; and
  receiving the social status information that is returned by the server and acquired from the social status information set and corresponds to the date information of the current day.

13. The information exhibiting method according to claim 11, further comprising:
  extracting feature social status information from at least one social status information recorded in a social status information set of a user in accordance with a specified extraction rule; and
  exhibiting the feature social status information in the information exhibiting interface.

14. A non-transitory computer readable storage medium on which instructions are stored, and a processing component of a computer executes the information exhibiting method according to claim 11 when the instructions are operated on the processing component.

15. An information exhibiting device, comprising:
  a display screen;
  a processor; and
  a memory configured to store instructions executable by the processor,
  wherein the processor is configured to:
  acquire target information; and
    exhibit the target information in a target information exhibiting region in an information exhibiting interface of the information exhibiting device, where the information exhibiting interface is able to be displayed after the information exhibiting device is powered on,
  wherein said acquiring the target information comprises:
  scanning a text-carrying object to acquire a scanned image and performing text recognition on the scanned image to acquire the target information; or,
  scanning a text-carrying object to acquire a scanned image and performing text recognition on the scanned image to acquire first target information, and receiving second target information sent by a terminal which is communicatively connected with the information exhibiting device,
  wherein the information exhibiting interface further comprises a social status information exhibiting region, and the processor is further configured to:
  acquire date information of a current day;
  acquire the social status information that corresponds to the date information of the current day from a social status information set of a user; and
    exhibit the social status information, which corresponds to the date information of the current day, in the social status information exhibiting region, the social status information set comprising a corresponding relationship between at least one set of the date information and the social status information.

16. The information exhibiting device according to claim 15, wherein the processor is further configured to:
  acquire the social status information released by the user and release date information of the social status information from local social application data; and
  store correspondingly the social status information released by the user and the release date information in the social status information set.

17. The information exhibiting device according to claim 15, wherein the processor is further configured to:
  send an information acquisition request that carries the date information of the current day to a server; and
  receive the social status information, which is returned by the server and acquired from the social status information set and corresponds to the date information of the current day.

18. The information exhibiting device according to claim 15, wherein the processor is further configured to:
  receive the social status information released by the user and sent by a terminal that is communicatively connected with the information exhibiting device, and the release date information of the social status information, where the social status information and the release date information are captured by the terminal from a social application installed in the terminal by using a data capture algorithm; and
  correspondingly store the social status information released by the user and the release date information in the social status information set.

19. The information exhibiting device according to claim 15, wherein the processor is further configured to:
  extract feature social status information from at least one social status information recorded in a social status information set of a user in accordance with a specified extraction rule; and
  exhibit, on the display screen, the feature social status information in the information exhibiting interface.

20. The information exhibiting device according to claim 19, wherein the specified extraction rule comprises at least one of the following: extracting the social status information including a special day field, extracting the social status information including a mood field and extracting the social status information which corresponds to a not commonly used geographic position.

* * * * *